(12) United States Patent
Liu

(10) Patent No.: US 12,129,933 B2
(45) Date of Patent: Oct. 29, 2024

(54) GAS SHUTOFF VALVE

(71) Applicant: NINGBO KINGDUN ELECTRONIC INDUSTRY CO., LTD., Ningbo (CN)

(72) Inventor: Xueyong Liu, Ningbo (CN)

(73) Assignee: NINGBO KINGDUN ELECTRONIC INDUSTRY CO., LTD., Ningbo (CN)

( * ) Notice: Subject to any disclaimer, the term of this patent is extended or adjusted under 35 U.S.C. 154(b) by 0 days.

(21) Appl. No.: 18/111,531

(22) Filed: Feb. 18, 2023

(65) Prior Publication Data

US 2024/0102572 A1    Mar. 28, 2024

(30) Foreign Application Priority Data

Sep. 28, 2022  (CN) .......................... 202222602944.9

(51) Int. Cl.
*F16K 1/36*  (2006.01)
*F16K 27/02*  (2006.01)
*F16K 41/04*  (2006.01)

(52) U.S. Cl.
CPC ................ *F16K 27/02* (2013.01); *F16K 1/36* (2013.01); *F16K 41/04* (2013.01)

(58) Field of Classification Search
CPC ............. F16K 1/36; F16K 27/02; F16K 41/04
See application file for complete search history.

(56) References Cited

U.S. PATENT DOCUMENTS

| 3,301,525 A | 1/1967 | Chernak et al. |
| 10,041,396 B2 | 8/2018 | Lenk et al. |
| 2023/0204129 A1* | 6/2023 | Lenk ................. F02B 37/183 |
| | | 251/129.15 |

FOREIGN PATENT DOCUMENTS

| CN | 102878343 A | 1/2013 |
| CN | 103711956 A | 4/2014 |
| CN | 207437799 U | 6/2018 |
| CN | 113639054 A | 11/2021 |
| CN | 217634126 U | 10/2022 |
| CN | 218267285 U | 1/2023 |
| EP | 3627022 A1 | 3/2020 |
| JP | 2012017830 A | 1/2012 |

OTHER PUBLICATIONS

European search report of EP23159235.3.
International Search Report of PCT/CN2023/072352.

* cited by examiner

*Primary Examiner* — Paul J Gray

(57) ABSTRACT

A gas shutoff valve is provided. The gas shutoff valve includes a valve seat, a valve rod, an elastic sealing mechanism, a plastic base, and a sealing cover plate. The valve rod extends through the plastic base and into the valve seat, and is connected to the elastic sealing mechanism. The sealing cover plate is mounted on the valve seat, and the elastic sealing mechanism is disposed between the valve seat and the sealing cover plate. And one end of the elastic sealing mechanism away from the valve seat abuts against the sealing cover plate.

7 Claims, 4 Drawing Sheets

GAS SHUTOFF VALVE

CROSS-REFERENCE TO RELATED APPLICATIONS

This application claims all benefits accruing under 35 U.S.C. § 119 from China Patent Application No. 202222602944.9, filed on Sep. 28, 2022, titled "GAS SHUTOFF VALVE" in the China National Intellectual Property Administration, the content of which is hereby incorporated by reference.

TECHNICAL FIELD

The present disclosure relates to the field of gas valve, and in particular, to a gas shutoff valve.

BACKGROUND

A gas shutoff valve may be linked to a gas alarm, and once the gas shutoff valve receives a signal sent by the gas alarm, it can close a gas channel, so as to avoid accidents caused by gas leakage.

At present, a sealing member used for closing the gas channel in a conventional gas shutoff valve is directly cooperated with a plastic base in the gas shutoff valve, and plays a role of sealing. Because the sealing member applied in the gas shutoff valve is pushed by a spring, the plastic base in the conventional gas shutoff valve is constantly subject to the action of a force. However, compressive strength of the plastic base is limited, and with different conditions of use time, pollution and pressure of environment, the plastic base will have different degrees of aging, thereby causing the gas leakage of the gas shutoff valve.

SUMMARY

For solving the above problem, it is necessary to provide a gas shutoff valve.

A gas shutoff valve includes a valve seat, a valve rod, an elastic sealing mechanism, and a plastic base. The valve rod extends through the plastic base and into the valve seat, and is connected to the elastic sealing mechanism. And the gas shutoff valve further includes a sealing cover plate, the sealing cover plate is mounted on the valve seat, the elastic sealing mechanism is disposed between the valve seat and the sealing cover plate, and one end of the elastic sealing mechanism away from the valve seat abuts against the sealing cover plate.

In the present disclosure, by providing the sealing cover plate, the elastic sealing mechanism can be pressed and limited on the valve seat via the sealing cover plate. In this way, the sealing cover plate can bear pressure applied by the elastic sealing mechanism, and the plastic base of the gas shutoff valve cannot be under pressure, so that service life of the plastic base can be prolonged, and the gas leakage caused by aging of the plastic base can be avoided. In addition, the sealing cover plate can be configured for bearing pressure, thus improving overall working pressure resistance of the gas shutoff valve.

In some embodiments, a bending portion is defined by the sealing cover plate partially bent along a direction away from the valve seat, and the elastic sealing mechanism is disposed between the bending portion and the valve seat.

It can be understood that the bending portion is provided on the sealing cover plate, so as to provide enough installation space for the installation of the elastic sealing mechanism between the sealing cover plate and the valve seat, and to meet use demand of the gas shutoff valve.

In some embodiments, the sealing cover plate is made of metal.

It can be understood that the sealing cover plate is made of metal, so that a metal material can be provided in the sealing cover plate. And the material characteristics of the metal cover plate can be used to ensure structural strength of the sealing cover plate as a whole, and to meet the use demand of the gas shutoff valve.

In some embodiments, the gas shutoff valve further includes a sealing seat, and the sealing seat is disposed between the sealing cover plate and the elastic sealing mechanism, and sleeved on the valve rod. And a sealing ring is provided between the sealing seat and the valve rod.

It can be understood that the above structure of the sealing seat and the sealing ring can be provided to achieve an assembly sealing between the valve rod and the sealing cover plate.

In some embodiments, a plurality of the sealing rings are arranged at intervals along an axial direction of the valve rod.

It can be understood that a plurality of the sealing rings can be provided in the present disclosure, further improving sealing performance of the assembly of the valve rod and the sealing cover plate.

In some embodiments, the gas shutoff valve further includes a sealing member, and the sealing member includes a first portion and a second portion. The first portion is disposed between the sealing cover plate and the valve seat, achieving an assembly sealing between the sealing cover plate and the valve seat. And the second portion is disposed between the sealing base and the elastic sealing mechanism.

It can be understood that the structure of the first portion on the sealing member can be used to seal the assembly of the sealing cover plate and the valve seat, and the structure of the second portion on the sealing member can provide a cushion on a joint between the elastic sealing mechanism and the sealing seat.

In some embodiments, the sealing member further includes a third portion, and the third portion and the first portion are arranged at intervals along a radial direction of the valve rod. And the third portion is disposed between the sealing cover plate and the valve seat to seal the sealing cover plate and the valve seat.

It can be understood that the structure of the third portion on the sealing member can be provided in the present disclosure, further improving sealing performance of the assembly of the sealing cover plate and the valve seat.

In some embodiments, the elastic sealing mechanism includes an elastic supporting seat, an elastic member and a sealing assembly. The sealing assembly is position-limitedly mounted on the valve rod along an axial direction thereof. And the elastic member is sleeved on the valve rod and abuts against the elastic supporting seat and the sealing assembly respectively, so that the valve rod is capable of controlling opening and closing of the valve seat via the sealing assembly.

It can be understood that the structure of the elastic supporting seat, the elastic member and the sealing assembly can be provided above, thereby specifically realizing structural configuration of the elastic sealing mechanism.

In some embodiments, the sealing assembly includes a sealing gasket and a sealing liner, and the sealing gasket is capable of being mounted on the valve rod through the sealing liner.

It can be understood that the structure of the sealing gasket and the sealing liner can be provided above, thereby specifically realizing structural configuration of the sealing assembly.

In some embodiments, the elastic sealing mechanism further includes an elastic limiting piece, and the elastic limiting piece is disposed between the elastic member and the sealing assembly.

It can be understood that the structure of the elastic limiting piece can be provided above, so that the elastic member can push against the sealing assembly through the elastic limiting piece, thus improving stress balance of the sealing assembly when pushed by the elastic member, and ensuring that the sealing assembly is capable of closing of the valve seat when acting on the valve seat.

Compared with related art, advantages of the present disclosure are as follows.

The gas shutoff valve is provided in the present disclosure, and the elastic sealing mechanism can be pressed and limited on the valve seat via the sealing cover plate of the gas shutoff valve. In this way, the sealing cover plate can bear pressure applied by the elastic sealing mechanism, and the plastic base in the gas shutoff valve cannot be under pressure, so that service life of the plastic base can be prolonged, and the gas leakage caused by aging of the plastic base can be avoided. In addition, the sealing cover plate can be configured for bearing pressure, thus improving overall working pressure resistance of the gas shutoff valve.

BRIEF DESCRIPTION OF THE DRAWINGS

To illustrate technical solutions of the embodiments and/or the conventional technology more clearly, the figures in the description of the embodiments or conventional technology will be briefly described in the following. It is obvious that the following description of the figures is only some embodiments of the present disclosure, for those of ordinary skilled in the art, other figures may be obtained according to these figures without creative work.

Figure 1:
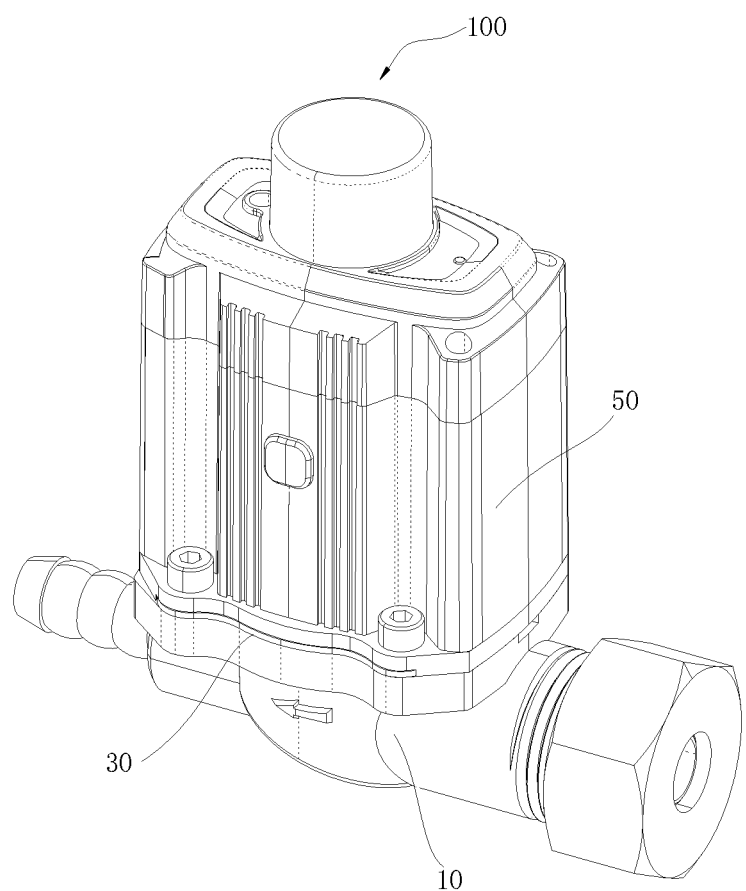
FIG. 1 is a structural schematic view of a gas shutoff valve in an embodiment of the present disclosure.

In the figures, 100 represents a gas shutoff valve, 10 represents a valve seat, 20 represents a valve rod, 30 represents a sealing cover plate, 301 represents a metal cover plate, 31 represents a bending portion, 40 represents an elastic sealing mechanism, 41 represents an elastic supporting seat, 42 represents an elastic member, 43 represents a sealing assembly, 431 represents a sealing gasket, 432 represents a sealing liner, 44 represents an elastic limiting piece, 50 represents a plastic base, 60 represents a sealing seat, 61 represents a sealing ring, 70 represents a sealing member, 71 represents a first portion, 72 represents a second portion, 73 represents a third portion, and 310 represents a locking member.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without departing from the inventive scope are the scope of the present disclosure.

It should be noted that when an element is referred to as being "mounted on" another element, it may be directly mounted on the other element or a further element may be presented between them. When an element is considered to be "disposed on" another element, it may be directly disposed on the other element or a further element may be presented between them. And when an element is considered to be "fixed on" another element, it may be directly fixed on the other element or a further element may be presented between them.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Referring to FIG. 1 to FIG. 4, a gas shutoff valve 100 is provided in an embodiment of the present disclosure, and the gas shutoff valve 100 includes a valve seat 10, a valve rod 20, a sealing cover plate 30, an elastic sealing mechanism 40, and a plastic base 50. The valve rod 20 extends through the plastic base 50 and into the valve seat 10, and is connected to the elastic sealing mechanism 40, the sealing cover plate 30 is mounted on the valve seat 10, and the elastic sealing mechanism 40 is disposed between the valve seat 10 and the sealing cover plate 30. And one end of the elastic sealing mechanism 40 away from the valve seat 10 abuts against the sealing cover plate 30. That is, the elastic sealing mechanism 40 of the gas shutoff valve 100 in this embodiment can be specifically pressed and limited on the valve seat 10 via the sealing cover plate 30. In this way, the sealing cover plate 30 can bear pressure applied by the elastic sealing mechanism 40, and the plastic base 50 in the gas shutoff valve 100 cannot be under pressure, so that service life of the plastic base 50 can be prolonged, and the gas leakage caused by aging of the plastic base 50 can be avoided. In addition, the sealing cover plate 30 can be configured for bearing pressure, thus improving overall working pressure resistance of the gas shutoff valve 100. It should be noted that the above-mentioned plastic base 50 can be specifically mounted on the sealing cover plate 30, and a valve rod driving mechanism (not shown) used to control vertical movement of the valve rod 20 in the gas shutoff valve 100 can be specifically mounted in the plastic base 50. When the gas shutoff valve 100 is in operation, mechanical parts and electrical parts of the valve rod 20 used to control vertical movement thereof can adopt conventional technology. Since it is not the scope of the claimed disclosure, which will not be elaborated herein.

Figure 2:
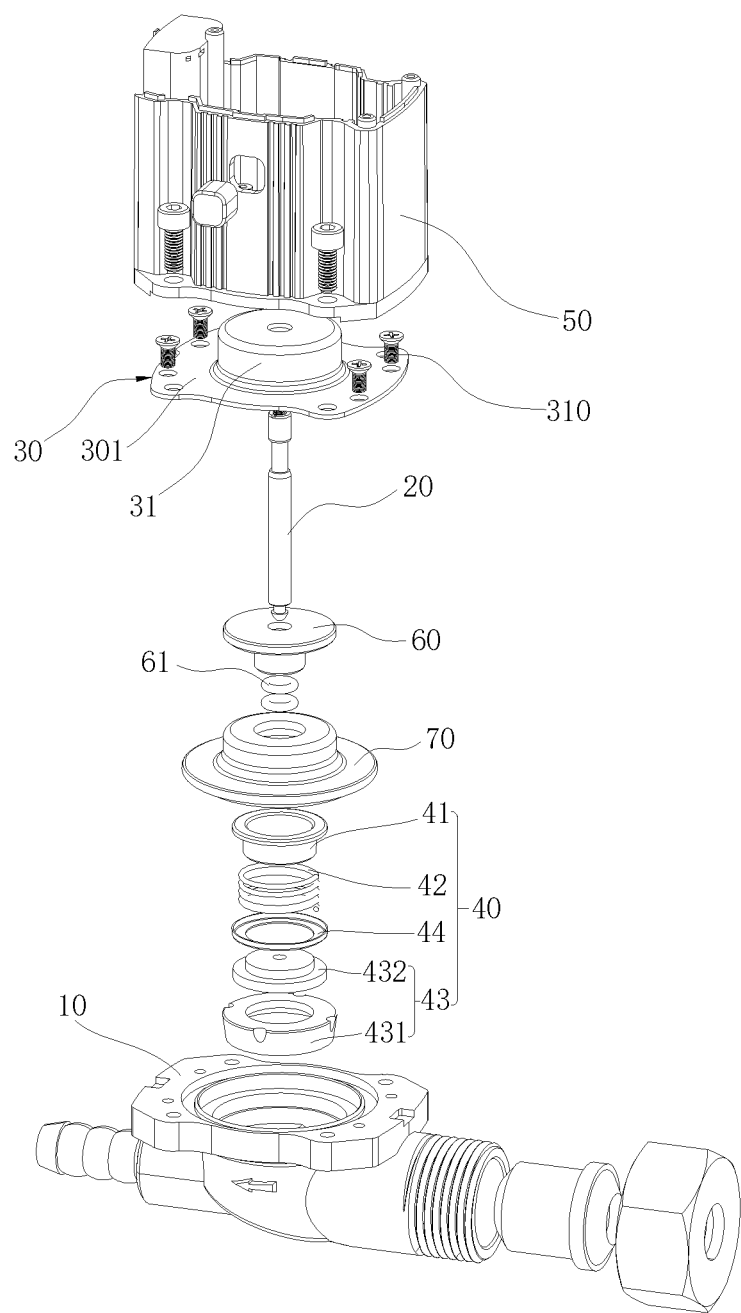
FIG. 2 is a partial exploded view of a gas shutoff valve in an embodiment of the present disclosure.

Referring to FIG. 2, in an embodiment, a bending portion 31 can be defined by the sealing cover plate 30 partially bent along a direction away from the valve seat 10, and the elastic sealing mechanism 40 can be disposed between the bending portion 31 and the valve seat 10. In this way, so as to specifically realize an assembly connection of the sealing cover plate 30 on the valve seat 10. It can be understood that the bending portion 31 can be provided on the sealing cover plate 30, so as to provide enough installation space for the installation of the elastic sealing mechanism 40 between the sealing cover plate 30 and the valve seat 10, and to meet use demand of the gas shutoff valve 100.

The gas shutoff valve 100 can further include a locking member 310, and the sealing cover plate 30 can abut against the valve seat 10 and be locked by the locking member 310. Specifically, the locking member 310 can include countersunk head screws, and a plurality of the countersunk head screws can be provided to improve structural stability of the sealing cover plate 30 mounted on the valve seat 10.

Specifically, the sealing cover plate 30 can be made of metal, i.e. a metal cover plate 301. And the material characteristics of the metal cover plate 301 can be used to ensure structural strength thereof as a whole, and to meet the use demand of the gas shutoff valve 100. It should be noted that the above sealing cover plate 30 is not limited to be made of metal with a certain strength, and for those skilled in the art, the sealing cover plate 30 may also be made of other plastic materials with high strength, which will not be elaborated herein.

Figure 3:
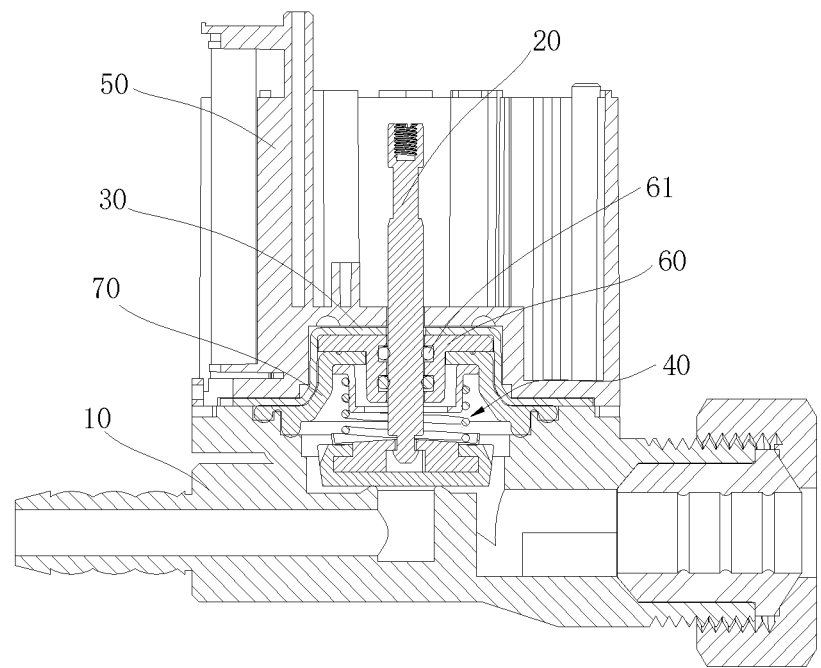
FIG. 3 is a partial sectional view of a gas shutoff valve in an embodiment of the present disclosure.
Figure 4:
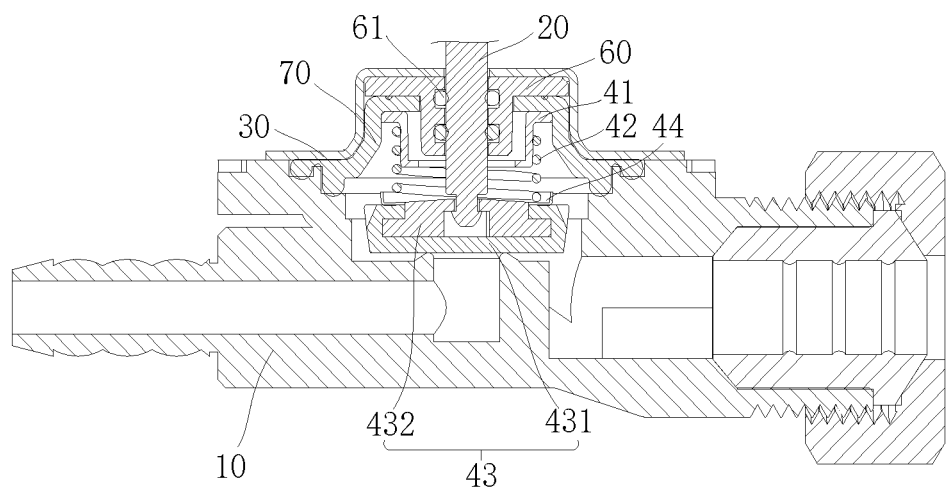
FIG. 4 is a partial schematic view of the gas shutoff valve of FIG. 3.

Referring to FIG. 3 and FIG. 4, in an embodiment, the elastic sealing mechanism 40 can include an elastic supporting seat 41, an elastic member 42 and a sealing assembly 43. The sealing assembly 43 can be mounted on the valve rod 20 and limited along an axial direction of the valve rod 20. That is, the sealing assembly 43 can be fixed to the valve rod 20 and limited by the valve rod 20 along the axial direction thereof. The elastic member 42 can be sleeved on the valve rod 20 and abut against the elastic supporting seat 41 and the sealing assembly 43 respectively, so that the valve rod 20 is capable of controlling opening and closing of the valve seat 10 via the sealing assembly 43, thereby specifically realizing structural configuration of the elastic sealing mechanism 40. It should be noted that the above elastic member 42 can be a spring.

The sealing assembly 43 can include a sealing gasket 431 and a sealing liner 432, and the sealing gasket 431 is capable of being mounted on the valve rod 20 through the sealing liner 432, thereby specifically realizing structural configuration of the sealing assembly 43. It should be noted that the sealing liner 432 can be a rigid structure, and the sealing liner 432 can be specifically clamped to the valve rod 20.

Furthermore, the elastic sealing mechanism 40 can further include an elastic limiting piece 44. The elastic limiting piece 44 can be disposed between the elastic member 42 and the sealing assembly 43. In this way, stress balance of the sealing assembly 43 can be improved when pushed by the elastic member 42, and it can be ensured that the sealing assembly is capable of closing of the valve seat 10 when acting on the valve seat 10.

Referring to FIG. 1 and FIG. 2, the gas shutoff valve 100 can further include a sealing seat 60, and the sealing seat 60 can be disposed between the sealing cover plate 30 and the elastic sealing mechanism 40, and sleeved on the valve rod 20. A sealing ring 61 can be provided between the sealing seat 60 and the valve rod 20. An assembly sealing can be achieved between the sealing seat 60 and the valve rod 20 through the sealing ring 61, thereby achieving an assembly sealing between the valve rod 20 and the sealing cover plate 30. It should be noted that the above sealing seat 60 can be specifically metal pieces or non-metallic pieces with high strength.

Furthermore, a plurality of the sealing rings 61 can be arranged at intervals along an axial direction of the valve rod 20, thus further improving a sealing performance of the assembly of the valve rod 20 and the sealing cover plate 30. It should be noted that two sealing rings 61 can be provided in the gas shutoff valve 100 of this embodiment, and the number of the sealing rings 61 is not limited in the figures, the number of sealing rings 61 can be one, three, or even more for those skilled in the art.

Figure 5:
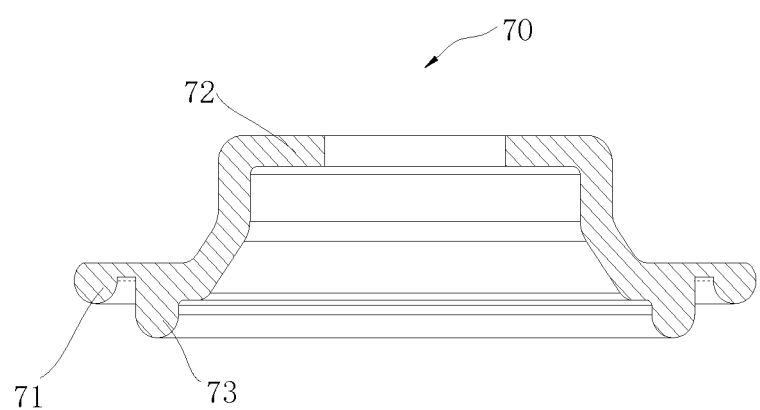
FIG. 5 is a sectional view of a gas shutoff valve in an embodiment of the present disclosure.

Referring to FIG. 3 to FIG. 5, the gas shutoff valve 100 can further include a sealing member 70. The sealing member 70 can include a first portion 71 and a second portion 72. The first portion 71 can be disposed between the sealing cover plate 30 and the valve seat 10, achieving an assembly sealing between the sealing cover plate 30 and the valve seat 10. The second portion 72 can be disposed between the sealing base 60 and the elastic sealing mechanism 40. In this way, structural characteristics of the sealing member 70 can provide a cushion on a joint between the elastic sealing mechanism and the sealing seat.

Furthermore, the sealing member 70 can further include a third portion 73. The third portion 73 and the first portion 71 can be arranged at intervals along a radial direction of the valve rod 20. The third portion 73 can be disposed between the sealing cover plate 30 and the valve seat 10 to seal the sealing cover plate 30 and the valve seat 10. That is, the sealing cover plate 30 and the valve seat 10 of the present embodiment can be sealed by the first portion 71 and the third portion 73, thus further improving sealing performance of the assembly of the sealing cover plate 30 and the valve seat 10.

In conclusion, the gas shutoff valve 100 is provided in the present disclosure, and the elastic sealing mechanism 40 can be pressed and limited on the valve seat 10 via the sealing cover plate 30 of the gas shutoff valve 100. In this way, the sealing cover plate 30 can bear pressure applied by the elastic sealing mechanism 40, and the plastic base 50 in the gas shutoff valve 100 cannot be under pressure, so that service life of the plastic base 50 can be prolonged, and the gas leakage caused by aging of the plastic base 50 can be avoided. In addition, the sealing cover plate 30 can be configured for bearing pressure, thus improving overall working pressure resistance of the gas shutoff valve 100.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

It should be understood by those skilled in the art that the above embodiments are intended to illustrate the present disclosure only, and are not intended to limited to the present disclosure, and various variations and modifications will be made in the present disclosure without departing from the spirit and scope of the present disclosure, and these variations and modifications belong to the scope of the claimed disclosure.

I claim:

1. A gas shutoff valve, comprising a valve seat, a valve rod, an elastic sealing mechanism, and a plastic base, wherein
the valve rod extends through the plastic base and into the valve seat, and is connected to the elastic sealing mechanism,
the gas shutoff valve further comprises a sealing cover plate, the sealing cover plate is mounted on the valve seat, the elastic sealing mechanism is disposed between the valve seat and the sealing cover plate;
the elastic sealing mechanism comprises an elastic supporting seat, an elastic member and a sealing assembly, the sealing assembly is position-limitedly mounted on the valve rod along an axial direction thereof, and the elastic member is sleeved on the valve rod and abuts against the elastic supporting seat and the sealing assembly respectively, so that the valve rod is capable of controlling opening and closing of the valve seat via the sealing assembly;

the gas shutoff valve further comprises a sealing seat, the sealing seat is disposed between the sealing cover plate and the elastic sealing mechanism, and sleeved on the valve rod, and a sealing ring is provided between the sealing seat and the valve rod; and the gas shutoff valve further comprises a sealing member, the sealing member comprises a first portion and a second portion, and the first portion is disposed between the sealing cover plate and the valve seat, achieving an assembly sealing between the sealing cover plate and the valve seat, the second portion is disposed between the sealing base and the elastic supporting seat of the elastic sealing mechanism, a part of the elastic supporting seat abuts against a part of the second portion of the sealing member.

2. The gas shutoff valve of claim 1, wherein a bending portion is defined by the sealing cover plate partially bent along a direction away from the valve seat, and the elastic sealing mechanism is disposed between the bending portion and the valve seat.

3. The gas shutoff valve of claim 1, wherein the sealing cover plate is made of metal.

4. The gas shutoff valve of claim 1, wherein a plurality of the sealing rings are arranged at intervals along an axial direction of the valve rod.

5. The gas shutoff valve of claim 1, wherein the sealing member further comprises a third portion, and the third portion and the first portion are arranged at intervals along a radial direction of the valve rod, the third portion is disposed between the sealing cover plate and the valve seat to seal the sealing cover plate and the valve seat.

6. The gas shutoff valve of claim 1, wherein the sealing assembly comprises a sealing gasket and a sealing liner, and the sealing gasket is capable of being mounted on the valve rod through the sealing liner.

7. The gas shutoff valve of claim 1, wherein the elastic sealing mechanism further comprises an elastic limiting piece, and the elastic limiting piece is disposed between the elastic member and the sealing assembly.

* * * * *